United States Patent
Kobayashi (10) Patent No.: US 11,953,223 B2
(45) Date of Patent: Apr. 9, 2024

(54) SENSOR DEVICE AND AIR-CONDITIONING MANAGEMENT SYSTEM

(71) Applicant: Panasonic Intellectual Property Management Co., Ltd., Osaka (JP)

(72) Inventor: Kazuyuki Kobayashi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 241 days.

(21) Appl. No.: 17/760,891

(22) PCT Filed: Sep. 15, 2020

(86) PCT No.: PCT/JP2020/034846
§ 371 (c)(1),
(2) Date: Mar. 16, 2022

(87) PCT Pub. No.: WO2021/060067
PCT Pub. Date: Apr. 1, 2021

(65) Prior Publication Data
US 2022/0341619 A1  Oct. 27, 2022

(30) Foreign Application Priority Data
Sep. 26, 2019  (JP) .................................. 2019-174887

(51) Int. Cl.
*F24F 11/70*  (2018.01)
*F24F 11/52*  (2018.01)
(Continued)

(52) U.S. Cl.
CPC .............. *F24F 11/70* (2018.01); *F24F 11/52* (2018.01); *F24F 11/62* (2018.01); *H04W 4/38* (2018.02);
(Continued)

(58) Field of Classification Search
CPC .. F24F 11/30; F24F 11/50; F24F 11/52; F24F 11/54; F24F 11/62; F24F 11/70;
(Continued)

(56) References Cited

U.S. PATENT DOCUMENTS

| | | | | |
|---|---|---|---|---|
| 11,719,677 B1* | 8/2023 | Conway | ............. | G01N 33/0075 73/31.02 |
| 2019/0083917 A1* | 3/2019 | Najafi | ...................... | F24F 13/20 |
| 2019/0346417 A1* | 11/2019 | Benefield | ................. | F24F 11/58 |

FOREIGN PATENT DOCUMENTS

| | | | | |
|---|---|---|---|---|
| CN | 202958015 U | * | 5/2013 | |
| CN | 105650757 A | * | 6/2016 | ............... F24F 11/30 |

(Continued)

OTHER PUBLICATIONS

"Heat Exchange Ventilation System Equipped with IAQ Control-Ceiling & Under Floor Mounted Type", URL:https://sumai.panasonic.jp/air/kanki/kodatekicho/netsuiaq.html.
International Search Report issued in Patent Application No. PCT/JP2020/034846 dated Nov. 2, 2020.

*Primary Examiner* — Crystal J Barnes-Bullock
(74) *Attorney, Agent, or Firm* — PEARNE & GORDON LLP (57) ABSTRACT

Detector (300) detects information regarding air quality. First communicator (330) is compatible with a first system for controlling equipment. Second communicator (340) is compatible with a second system for accumulating the information regarding the air quality. Controller (310) transmits the information regarding the air quality to the second system based on a state of the information regarding the air quality having been detected.

9 Claims, 5 Drawing Sheets (51) Int. Cl.
*F24F 11/62* (2018.01)
*H04W 4/38* (2018.01)
*F24F 110/65* (2018.01)
*F24F 110/66* (2018.01)
*F24F 110/70* (2018.01)

(52) U.S. Cl.
CPC ....... *F24F 2110/65* (2018.01); *F24F 2110/66* (2018.01); *F24F 2110/70* (2018.01)

(58) Field of Classification Search
CPC .............. F24F 2110/50; F24F 2110/65; F24F 2110/66; F24F 2110/70; H04W 4/30; H04W 4/33; H04W 4/38; G08B 21/02; G08B 21/12; G08B 21/14
See application file for complete search history.

(56) References Cited

FOREIGN PATENT DOCUMENTS

| | | | | |
|---|---|---|---|---|
| CN | 205561030 U | * | 9/2016 | |
| CN | 106288169 A | * | 1/2017 | |
| CN | 106663361 A | * | 5/2017 | ............. F24F 11/30 |
| CN | 108663953 A | * | 10/2018 | |
| CN | 110095991 A | * | 8/2019 | ............. G05B 15/02 |
| CN | 110454923 A | * | 11/2019 | |
| CN | 210442648 U | * | 5/2020 | ............. G05B 15/02 |
| WO | 2016/021150 A1 | | 2/2016 | |

* cited by examiner

| CONDITIONS | DETERMINATION |
|---|---|
| ABSOLUTE VALUE OF CHANGE AMOUNT OF MEASUREMENT RESULT ≤ THRESHOLD | FIRST STATE |
| ABSOLUTE VALUE OF CHANGE AMOUNT OF MEASUREMENT RESULT > THRESHOLD | SECOND STATE |

FIG. 3B

| CONDITIONS | DETERMINATION |
|---|---|
| MEASUREMENT RESULT ≤ THRESHOLD | FIRST STATE |
| MEASUREMENT RESULT > THRESHOLD | SECOND STATE |

SENSOR DEVICE AND AIR-CONDITIONING MANAGEMENT SYSTEM

TECHNICAL FIELD

The present disclosure relates to a communication technique, in particular, relates to a sensor device and an air-conditioning management system that transmit information regarding air quality.

BACKGROUND ART

Indoor air quality (IAQ) generally indicates the air quality in a building or the like. Air quality indicates a state of air including chemical factors such as $CO_2$ and formaldehyde, biological factors such as pollen and mold, and physical factors such as temperature and humidity. The IAQ equipment is equipment that attempts improvement of the IAQ, and a heat exchange ventilation device, which is one of the IAQ equipment, operates based on a measurement result from a sensor device that measures an indoor air environment (see, e.g., NPL 1).

CITATION LIST

Non-Patent Literature

NPL 1: IAQ-controlled heat exchange ventilation system, [online], Internet <URL: https://sumai.panasonic.jp/air/kanki/kodatekicho/netsuiaq.html>

SUMMARY OF THE INVENTION

For example, the sensor device transmits information regarding air quality that is a measurement result to the IAQ equipment (hereinafter, referred to as "equipment") through communication. In order to effectively utilize this information, it is required to transmit information to a cloud server other than the equipment. However, when information is transmitted to the cloud server, a usage fee for the cloud server is charged according to the amount of data transmitted. Therefore, it is desirable to efficiently transmit information while suppressing the amount of data to be transmitted.

The present disclosure has been made in view of such a circumstance, and an object of the present disclosure is to provide a technique for efficiently transmitting information while suppressing the amount of data to be transmitted to the cloud server.

In order to solve the above problem, a sensor device according to an aspect of the present disclosure includes: a sensor that detects information regarding air quality; a first communicator that transmits the information regarding the air quality to a first system for controlling one or a plurality of air conditioners; a second communicator that transmits the information regarding the air quality to a second system for accumulating the information regarding the air quality; and a controller that controls the first communicator and the second communicator, in which the controller controls transmission of the information regarding the air quality to the second system based on a state of the information regarding the air quality detected by the sensor.

Another aspect of the present disclosure is an air-conditioning management system. This air-conditioning management system is an air-conditioning management system including: a sensor device that detects information regarding air quality; a first system for controlling one or a plurality of air conditioners; and a second system for accumulating the information regarding the air quality, in which the sensor device includes a sensor that detects the information regarding the air quality, a first communicator that transmits the information regarding the air quality to the first system for controlling one or a plurality of air conditioners, a second communicator that transmits the information regarding the air quality to the second system for accumulating the information regarding the air quality, and a controller that controls the first communicator and the second communicator, and the controller controls transmission of the information regarding the air quality to the second system based on a state of the information regarding the air quality detected by the sensor.

Any combinations of the above-described components and modifications of the expressions of the present disclosure among methods, devices, systems, recording media, and computer programs are also effective as aspects of the present disclosure.

According to the present disclosure, it is possible to efficiently transmit information while suppressing an amount of data to be transmitted to a cloud server.

DESCRIPTION OF EMBODIMENT

Before specifically describing an exemplary embodiment of the present disclosure, an outline of the exemplary embodiment will be described. The present exemplary embodiment relates to an air-conditioning management system that transmits information regarding air quality from a sensor device to equipment. The sensor device periodically transmits a measurement result by a near-field wireless communication system. The near-field wireless communication system is, e.g., Bluetooth (registered trademark), Bluetooth Low Energy (BLE), or ZigBee (registered trademark). The measurement result from the sensor device is received by a relay device, and the relay device transmits the measurement result by the near-field wireless communication system. The measurement result from the relay device is received by equipment, and the equipment executes an operation according to the measurement result. The sensor device may transmit the measurement result by a wired communication system instead of periodically transmitting the measurement result by the near-field wireless communication system.

The relay device can also perform communication by, e.g., a wireless local area network (LAN), and transmits the measurement result from the sensor device. The measurement result from the relay device is transmitted to a cloud server on the Internet via a router. The relay device may transmit the measurement result to the router by wired communication instead of communication by the wireless LAN. The cloud server aggregates the measurement results, notifies a user's smartphone or the like of the measurement results through an application program, and displays a progress graph of the accumulated measurement results on the smartphone.

Here, the relay device may transmit a part of the received measurement results instead of transmitting all the received measurement results. For example, assuming that the transmission frequency from the sensor device to the relay device is a "first frequency", the transmission frequency from the relay device to the equipment is a "second frequency", and the transmission frequency from the relay device to the router is the "third frequency", the first frequency>the second frequency>the third frequency is true. Thus, since the relay device not only relays the measurement result but also controls the transmission frequency, the relay device can be regarded as a control device.

In general, the third frequency is reduced to some extent in order to suppress an increase in the amount of data to be transmitted from the router to the cloud server. This corresponds to a long transmission interval of the measurement result from the router to the cloud server, and sacrifices the real-time property of the measurement result in the cloud server. In a case where the change in the measurement result is small or in a case where the measurement result indicates a normal value, such a transmission frequency causes no problem. However, in a case where the change in the measurement result is large or in a case where the measurement result indicates an abnormal value, real-time property is required. In such a situation, improvement of the real-time property requires a change in the operation of the relay device. However, it is desired to improve the real-time property as necessary without changing the operation of the relay device.

The sensor device according to the present exemplary embodiment is compatible with both the near-field wireless communication system and the wireless LAN. In a case where the change in the measurement result is small or in a case where the measurement result indicates a normal value, the sensor device transmits the measurement result at the first frequency by the near-field wireless communication system as ever. On the other hand, in a case where the change in the measurement result is large or in a case where the measurement result indicates an abnormal value, the sensor device transmits the measurement result at the first frequency by the near-field wireless communication system as ever, and transmits the measurement result by the wireless LAN at the timing of not transmitting the measurement result by the near-field wireless communication system. The sensor device may transmit the measurement result by the wireless LAN at the same time as the timing of transmitting the measurement result by the near-field wireless communication system, instead of the timing of not transmitting the measurement result by the near-field wireless communication system. The measurement result transmitted by the near-field wireless communication system is received by the relay device, but the measurement result transmitted by the wireless LAN is received by the router. Since the router transmits the measurement result received by the wireless LAN to the cloud server, the real-time property of the measurement result in the cloud server is improved, and the amount of data to be transmitted to the cloud server can be suppressed.

In a case where the change in the measurement result is small, seamless communication is performed among the sensor equipment, the relay device, the equipment, the router, and the cloud server at the first frequency, the second frequency, and the third frequency. Here, even when the change in the measurement result becomes large, the sensor device performs both transmission at the first frequency and transmission to the router via the wireless LAN. Due to this, the measurement result is efficiently sent to both the equipment requiring the measurement result and the cloud server.

Figure 1A:
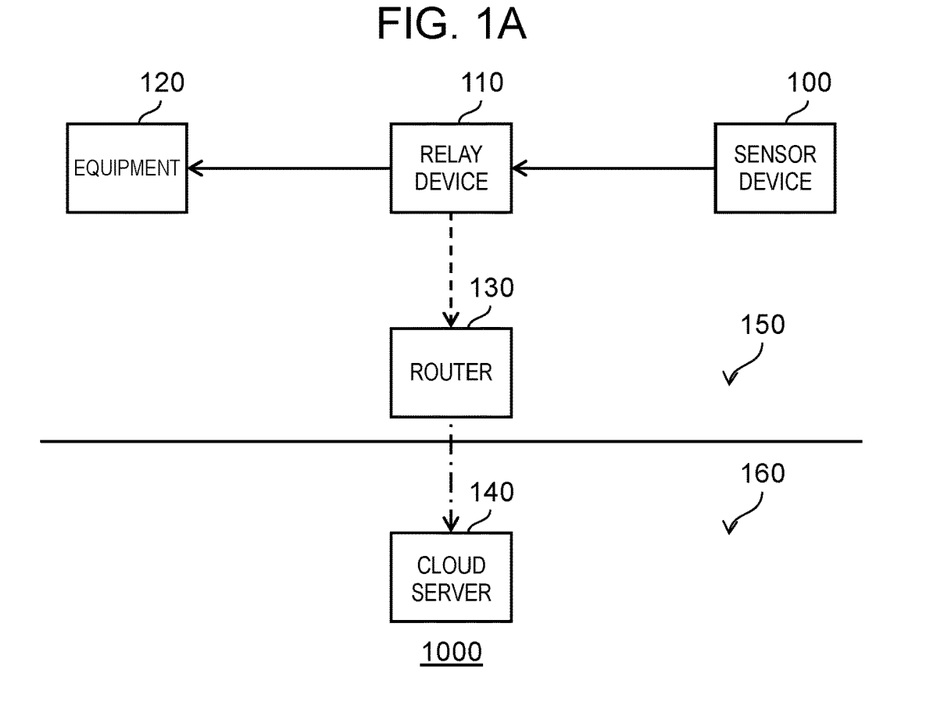
FIG. 1A is a view showing a configuration of an air-conditioning management system according to the present exemplary embodiment.

FIG. 1A shows the configuration of air-conditioning management system 1000. Air-conditioning management system 1000 is a comparison target of the present exemplary embodiment. Air-conditioning management system 1000 includes sensor device 100, relay device 110, equipment 120, router 130, and cloud server 140. Sensor device 100, relay device 110, equipment 120, and router 130 are installed inside home 150, and cloud server 140 is installed outside home 160.

Sensor device 100 is, e.g., an indoor air environment sensor, and has a function of individual sensing or combination sensing of air qualities such as temperature, humidity, PM 2.5 concentration, $CO_2$ concentration, volatile organic compounds (VOC) concentration, dust amount, and pollen amount. Sensor device 100 acquires measurement results of temperature, humidity, PM 2.5 concentration, $CO_2$ concentration, VOC concentration, dust amount, and pollen amount by individual sensing or combination sensing. Sensor device 100 is compatible with the near-field wireless communication system, and transmits a measurement result by the near-field wireless communication system.

Relay device 110 is compatible with the near-field wireless communication system, and receives and transmits a measurement result from sensor device 100 by the near-field wireless communication system. Relay device 110 may transmit the measurement result by a wired communication system instead of the short-distance wireless communication system. Relay device 110 transmits, at the second frequency, the measurement result received at the first frequency, and adjusts the second frequency under the condition of the first frequency>the second frequency. Any publicly known technique is only required to be used for adjusting the second frequency, and therefore the description thereof will be omitted here.

Equipment 120 is compatible with the near-field wireless communication system, and receives a measurement result from relay device 110 by the near-field wireless communication system. Equipment 120 may receive the measurement result from relay device 110 by a wired communication system instead of the near field communication system. Equipment 120 is IAQ equipment, and is, e.g., ventilation equipment (Type 1, Type 2, and Type 3) or an air conditioner such as a range hood. Equipment 120 executes an operation such as ventilation based on a received measurement result.

Relay device 110 is also compatible with the wireless LAN, and transmits, via the wireless LAN, the measurement result received from sensor device 100 by the near-field wireless communication system. The measurement result is transmitted at the third frequency by the wireless LAN. Relay device 110 may transmit at the third frequency by wired communication instead of the wireless LAN. As described above, the first frequency>the second frequency>the third frequency is true. Router 130 receives the measurement result from relay device 110. Router 130 transmits the measurement result to cloud server 140 via the Internet.

Cloud server 140 accumulates measurement results. Here, cloud server 140 may accumulate measurement results from another sensor device 100 not illustrated, or may accumulate measurement results from sensor device 100 inside home 150 that is different and not illustrated. As described above, cloud server 140 can provide a measurement result to a communication device such as a smartphone.

Figure 1B:
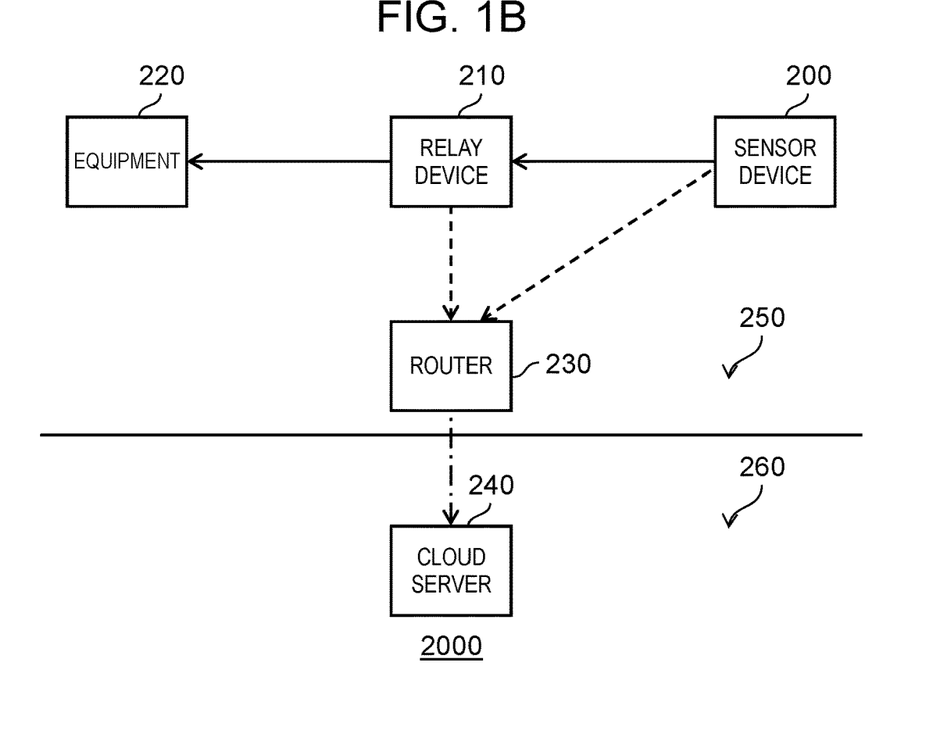
FIG. 1B is a view showing a configuration of the air-conditioning management system according to the present exemplary embodiment.
Figure 2:
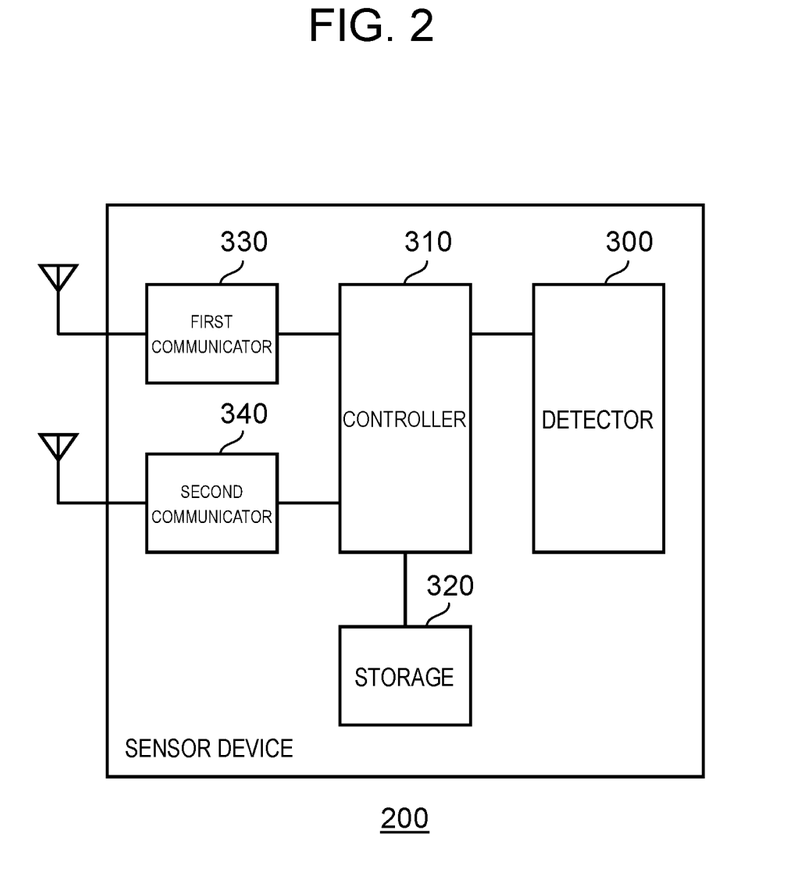
FIG. 2 is a view showing a configuration of a sensor device of FIG. 1B.

FIG. 1B shows the configuration of air-conditioning management system 2000. Air-conditioning management system 2000 includes sensor device 200, relay device 210, equipment 220, router 230, and cloud server 240. Sensor device 200, relay device 210, equipment 220, and router 230 are installed inside home 250, and cloud server 240 is installed outside home 260. FIG. 2 shows the configuration of sensor device 200. Sensor device 200 includes detector 300, controller 310, storage 320, first communicator 330, and second communicator 340.

Detector 300 is a sensor that detects information regarding air quality. Specifically, detector 300 has a sensing function similar to that of sensor device 100, and acquires measurement results of temperature, humidity, PM 2.5 concentration, $CO_2$ concentration, VOC concentration, dust amount, and pollen amount. Measurement in detector 300 is performed periodically, and detector 300 appropriately outputs a measurement result to controller 310. First communicator 330 executes communication compatible with the near field wireless communication system. Second communicator 340 executes communication compatible with the wireless LAN different from the near-field wireless communication system. Here, when the near field communication system is referred to as a first system, the wireless LAN is referred to as a second system. The first system is not limited to the near-field wireless communication system, and the second system is not limited to the wireless LAN. For example, the second system is only required to have a longer transmittable distance than that of the first system. Wired communication may be used instead of wireless communication.

Figure 3A:
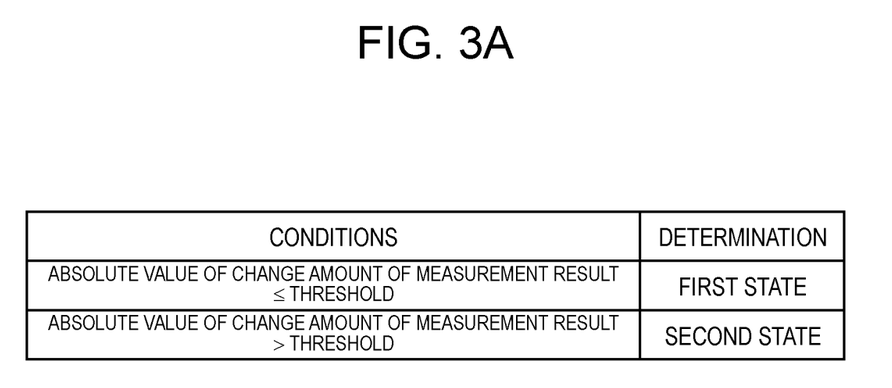
FIG. 3A is a view showing a data structure of a table stored in a storage of FIG. 2.
Figure 3B:
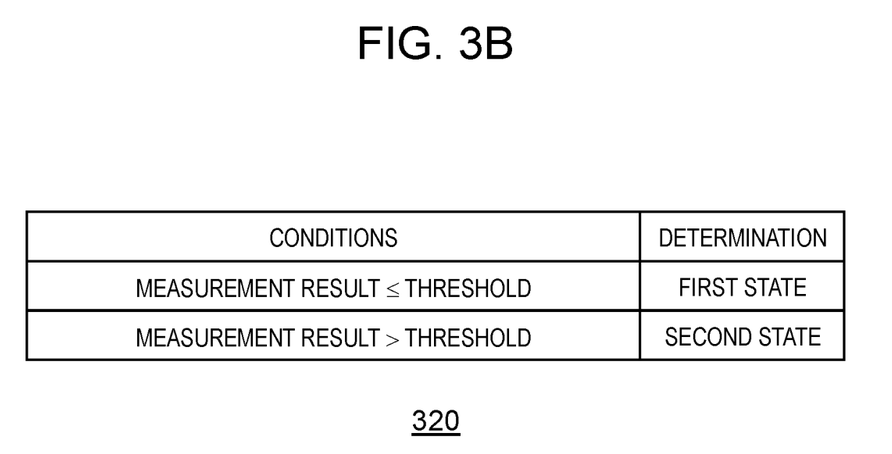
FIG. 3B is a view showing a data structure of the table stored in the storage of FIG. 2.

Controller 310 receives the measurement result from detector 300. Based on the measurement result, controller 310 determines whether to be a first state or a second state using a database stored in storage 320. For example, controller 310 derives an absolute value of the change amount per unit time of the measurement result based on the history of the measurement result. FIGS. 3A and 3B show the data structure of the table stored in storage 320. As shown in FIG. 3A, when the absolute value of the change amount per unit time of the measurement result is less than or equal to a threshold, it is determined to be the first state, meanwhile when the absolute value of the change amount per unit time of the measurement result is greater than the threshold, it is determined to be the second state. That is, in the first state, the change of the state is within a certain range, meanwhile in the second state, the change in the state is not within the certain range. FIG. 3B will be described later, and the description returns to FIG. 2.

Figure 4A:
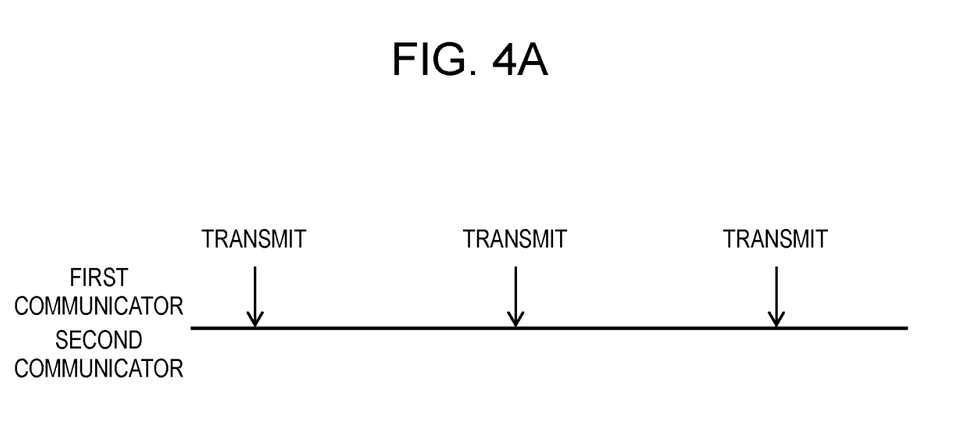
FIG. 4A is a view showing an outline of operations of a first communicator and a second communicator of FIG. 2.
Figure 4B:
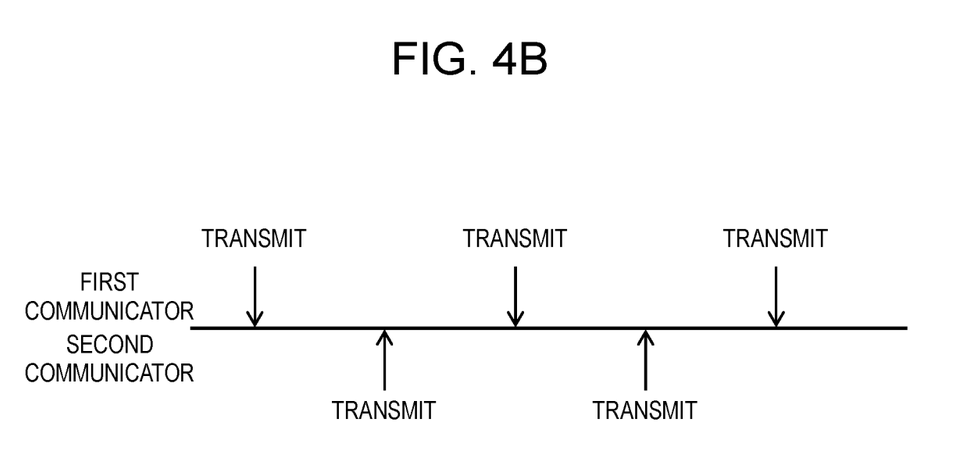
FIG. 4B is a view showing an outline of operations of the first communicator and the second communicator of FIG. 2.

When determining to be the first state, controller 310 causes first communicator 330 to transmit the measurement result at a predetermined interval, e.g., the first frequency. Controller 310 does not cause second communicator 340 to transmit the measurement result. At that time, controller 310 turns on first communicator 330 and turns off second communicator 340. FIGS. 4A and 4B show the outline of operations of first communicator 330 and second communicator 340. FIG. 4A shows a transmission operation in a case of the first state. As described above, only first communicator 330 executes transmission. This is the same as the transmission in sensor device 100. FIG. 4B will be described later, and the description returns to FIG. 2.

When determining to be the second state, controller 310 causes first communicator 330 to transmit the measurement result at a predetermined interval, e.g., the first frequency. Controller 310 causes second communicator 340 to transmit the measurement result at a timing when first communicator 330 is not transmitting the measurement result. At that time, controller 310 switches between a first operation of turning on first communicator 330 and turning off second communicator 340 and a second operation of turning off first communicator 330 and turning on second communicator 340. FIG. 4B shows a transmission operation in a case of the second state. Similarly to the case of the first state, first communicator 330 executes transmission, and second communicator 340 executes transmission at a timing when first communicator 330 is not transmitting. Here, second communicator 340 executes transmission once at a timing when first communicator 330 is not transmitting, but second communicator 340 may execute transmissions for a plurality of times. Controller 310 may cause second communicator 340 to transmit the measurement result at the same time as the timing when first communicator 330 is transmitting the measurement result, instead of causing second communicator 340 to transmit the measurement result at the timing when first communicator 330 is not transmitting the measurement result. The description returns to FIG. 2.

Controller 310 may determine whether to be the first state or the second state based on the measurement result instead of the absolute value of the change amount per unit time of the measurement result. As shown in FIG. 3B, when the measurement result is less than or equal to the threshold, it is determined to be the first state, meanwhile when the measurement result is greater than the threshold, it is determined to be the second state. That is, in the first state, the state is within a certain range, meanwhile in the second state, the state is not within the certain range. The subsequent processing is similar to that so far, and therefore the description will be omitted here. The description returns to FIG. 1B. Relay device 210 and equipment 220 are the same as relay device 110 and equipment 120 of FIG. 1A.

Similarly to router 130 of FIG. 1A, router 230 receives the measurement result from relay device 210 at the third frequency by the wireless LAN. When the measurement result is in the second state, router 230 also receives the measurement result from sensor device 200 by the wireless LAN. On the other hand, when the measurement result is in the first state, router 230 does not receive the measurement result from sensor device 200. Router 230 transmits the measurement result to cloud server 240 via the Internet. As a result, when the measurement result is in the first state, an increase in the amount of data to be transmitted from router 230 to cloud server 240 is suppressed. On the other hand, when the measurement result is in the second state, the real-time property of the measurement result to be accumulated in cloud server 240 is improved.

The subject of devices, systems, or methods in the present disclosure includes a computer. This computer executes the program, thereby implementing the function of the subject of devices, systems, or methods in the present disclosure. The computer includes, as a main hardware configuration, a processor that operates according to a program. The type of processor is not limited as long as the processor can implement the function by executing the program. The processor includes one or a plurality of electronic circuits including a semiconductor integrated circuit (IC) or a large scale integration (LSI). The plurality of electronic circuits may be integrated on one chip or may be provided on a plurality of chips. The plurality of chips may be aggregated into one device or may be provided in a plurality of devices. The program is recorded in a computer-readable non-transitory recording medium such as a read-only memory (ROM), an optical disk, or a hard disk drive. The program may be stored in advance in a recording medium, or may be supplied to the recording medium via a wide area communication network including the Internet.

Figure 5:
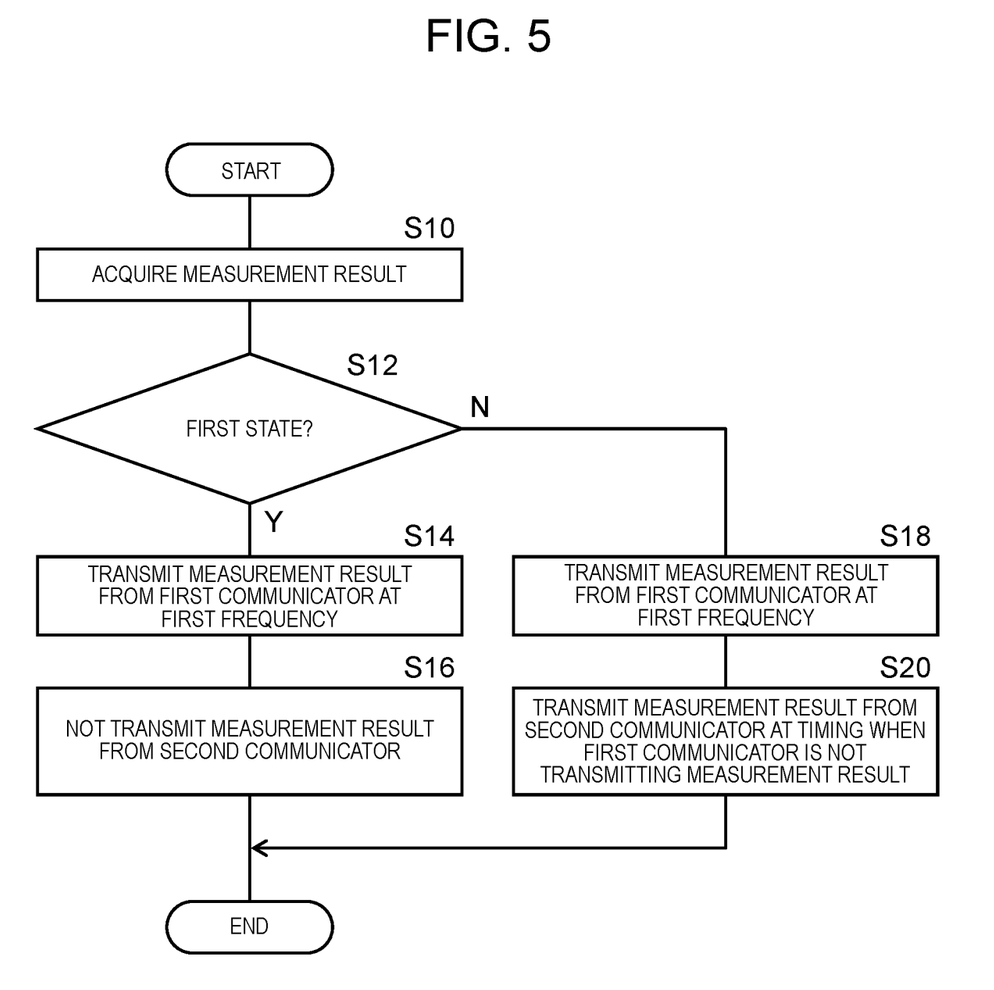
FIG. 5 is a flowchart showing a transmission procedure by the sensor device of FIG. 2.

The operation of air-conditioning management system 2000 having the above configuration will be described. FIG. 5 is a flowchart showing a transmission procedure by sensor device 200. Detector 300 acquires a measurement result (S10). In the case of the first state (Y in S12), controller 310 causes first communicator 330 to transmit the measurement result at the first frequency (S14), and does not cause second communicator 340 to transmit the measurement result (S16). In the case of not the first state (N in S12), controller 310 causes first communicator 330 to transmit the measurement result at the first frequency (S18), and causes second communicator 340 to transmit the measurement result at the timing when first communicator 330 is not transmitting the measurement result (S20).

According to the present exemplary embodiment, when the measurement result is in the first state, the measurement result is transmitted from first communicator 330 at a predetermined interval, and the measurement result is not transmitted from second communicator 340. Therefore, it is possible to suppress an increase in the amount of data to be transmitted from router 230 to cloud server 240. When the measurement result is in the second state, the measurement result is transmitted from first communicator 330 at a predetermined interval, and the measurement result is transmitted from second communicator 340. Therefore, it is possible to improve the real-time property. When the measurement result is in the second state, the measurement result is transmitted from first communicator 330 at a predetermined interval, and the measurement result is transmitted from second communicator 340. Therefore, it is possible to eliminate the need for change in the function of relay device 210. In the first state, an increase in the amount of data to be transmitted from router 230 to cloud server 240 is suppressed, and in the second state, the real-time property is improved. Therefore, it is possible to efficiently transmit the measurement result.

Since the first state is a state in which the change amount per unit time of the value of detector 300 is within a certain range, and the second state is a state in which the change amount per unit time of the value of detector 300 is not within a certain range, it is possible to specify a state in which the real-time property is to be improved while suppressing an increase in the amount of data to be transmitted to cloud server 240. Since the first state is a state in which the value of detector 300 is within a certain range, and the second state is a state in which the value of detector 300 is not within a certain range, it is possible to specify a state in which the real-time property is to be improved while suppressing an increase in the amount of data to be transmitted to cloud server 240. Since the measurement result is efficiently transmitted, it is possible to achieve both big data collection to cloud server 240 and rapid processing in relay device 210. Since the measurement result is efficiently transmitted, cloud server 240 can secure a necessary measurement result, and relay device 210 can obtain a necessary measurement result at a necessary timing.

An outline of one aspect of the present disclosure is as follows. Sensor device (200) according to an aspect of the present disclosure includes: a sensor (detector 300) that detects information regarding air quality; first communicator (330) that transmits information regarding the air quality to a first system for controlling one or a plurality of air conditioners; second communicator (340) that transmits information regarding the air quality to a second system for accumulating information regarding the air quality; and controller (310) that controls first communicator (330) and second communicator (340), in which controller (310) controls transmission of information regarding the air quality to the second system based on a state of information regarding the air quality detected by the sensor (detector 300).

When a detection value detected by the sensor (detector 300) is in the first state, controller (310) may cause first communicator (330) to transmit the detection value and not cause second communicator (340) to transmit the detection value. When the detection value detected by the sensor (detector 300) is in the second state different from the first state, controller (310) may cause second communicator (340) to transmit the detection value regardless of transmission of the detection value from first communicator (330).

The first state may be a state in which the value of the detection value is within a certain range, and the second state may be a state in which the value of the detection value is not within the certain range.

The first state may be a state in which the change amount per unit time of the detection value is within a certain range, and the second state may be a state in which the change amount per unit time of the detection value is not within the certain range.

Controller (310) may make the communication amount of second communicator (340) smaller than the communication amount of first communicator (330).

Another aspect of the present disclosure is air-conditioning management system (2000). Air-conditioning management system (2000) is air-conditioning management system (2000) including: sensor device (200) that detects information regarding air quality; a first system for controlling one or a plurality of air conditioners; and a second system for accumulating information regarding the air quality, in which sensor device (200) includes: a sensor (detector 300) that detects information regarding air quality; first communicator (330) that transmits information regarding the air quality to the first system for controlling one or a plurality of air conditioners; second communicator (340) that transmits information regarding the air quality to the second system for accumulating the information regarding the air quality; and controller (310) that controls first communicator (330) and second communicator (340), and in which controller (310) controls transmission of the information regarding the air quality to the second system based on a state of the information regarding the air quality detected by the sensor (detector 300).

When a detection value detected by the sensor (detector 300) is in a first state, controller (310) may cause first communicator (330) to transmit the detection value and not cause second communicator (340) to transmit the detection value. When the detection value detected by the sensor is in a second state different from the first state, controller (310) may cause second communicator (340) to transmit the detection value regardless of transmission of the detection value from first communicator (330).

The first system may include relay device (210) that receives the information regarding the air quality transmitted by sensor device (200), transmits the received information regarding air quality to the air conditioner (equipment 220), and transmits the received information regarding the air quality to the second system.

The present disclosure has been described so far based on the exemplary embodiment. It is to be understood by those skilled in the art that this exemplary embodiment is an example, various modifications can be made to combinations of those components or processing processes, and such modifications are also within the scope of the present disclosure.

INDUSTRIAL APPLICABILITY

The present invention is useful as a sensor device and an air-conditioning management system related to air quality.

REFERENCE MARKS IN THE DRAWINGS 100, 200 sensor device
110, 210 relay device
120, 220 equipment
130, 230 router
140, 240 cloud server
150, 250 inside home
160, 260 outside home
300 detector
310 controller
320 storage
330 first communicator
340 second communicator
1000, 2000 air-conditioning management system

What is claimed is:

1. A sensor device comprising:
a sensor that detects information regarding air quality;
a first communicator that transmits the information regarding the air quality to a first system for controlling one or more air conditioners;
a second communicator that transmits the information regarding the air quality to a second system for accumulating the information regarding the air quality; and
a controller that controls the first communicator and the second communicator,
wherein the controller controls transmission of the information regarding the air quality to the second system based on a state of the information regarding the air quality detected by the sensor.

2. The sensor device according to claim 1, wherein
when a detection value detected by the sensor is in a first state, the controller causes the first communicator to transmit the detection value and does not cause the second communicator to transmit the detection value, and
when the detection value detected by the sensor is in a second state different from the first state, the controller causes the second communicator to transmit the detection value regardless of transmission of the detection value from the first communicator.

3. The sensor device according to claim 2, wherein
the first state is a state in which the detection value is within a certain range, and
the second state is a state in which the detection value is not within the certain range.

4. The sensor device according to claim 2, wherein
the first state is a state in which a change amount per unit time of the detection value is within a certain range, and
the second state is a state in which the change amount per unit time of the detection value is not within the certain range.

5. The sensor device according to claim 1, wherein the controller makes a communication amount of the second communicator smaller than a communication amount of the first communicator.

6. The sensor device according to claim 1, wherein the sensor is a sensor corresponding to more than or equal to one of temperature, humidity, PM 2.5 concentration, $CO_2$ concentration, volatile organic compounds (VOC) concentration, dust amount, and pollen amount.

7. An air-conditioning management system comprising:
a sensor device that detects information regarding air quality;
a first system for controlling one or more air conditioners; and
a second system for accumulating the information regarding the air quality,
wherein the sensor device includes
a sensor that detects information regarding air quality,
a first communicator that transmits the information regarding the air quality to the first system for controlling one or more air conditioners,
a second communicator that transmits the information regarding the air quality to the second system for accumulating the information regarding the air quality, and
a controller that controls the first communicator and the second communicator, and
the controller controls transmission of the information regarding the air quality to the second system based on a state of the information regarding the air quality detected by the sensor.

8. The air-conditioning management system according to claim 7,
wherein
when a detection value detected by the sensor is in a first state, the controller causes the first communicator to transmit the detection value and does not cause the second communicator to transmit the detection value, and
when the detection value detected by the sensor is in a second state different from the first state, the controller causes the second communicator to transmit the detection value regardless of transmission of the detection value from the first communicator.

9. The air-conditioning management system according to claim 7 wherein the first system includes a relay device that receives the information regarding the air quality transmitted by the sensor device, transmits the received information regarding the air quality to one or the plurality of air conditioners, and transmits the received information regarding the air quality to the second system.

* * * * *